(12) United States Patent
Zhou et al.

(10) Patent No.: US 11,075,916 B2
(45) Date of Patent: Jul. 27, 2021

(54) ENTITLEMENT-DRIVEN COMMUNICATION OF FUNCTIONALITY PRIVILEGES BETWEEN NETWORK-BASED SERVICES

(71) Applicant: Microsoft Technology Licensing, LLC, Redmond, WA (US)

(72) Inventors: Li Zhou, Sunnyvale, CA (US); Armen N. Hamstra, Saratoga, CA (US); Caleb T. Johnson, Lakewood, IL (US); Yixiao Lu, Sunnyvale, CA (US); Sumanth Kolar, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 16/455,750

(22) Filed: Jun. 28, 2019

(65) Prior Publication Data
US 2020/0412729 A1    Dec. 31, 2020

(51) Int. Cl.
*G06F 15/16* (2006.01)
*H04L 29/06* (2006.01)
*H04L 29/08* (2006.01)

(52) U.S. Cl.
CPC ...... *H04L 63/102* (2013.01); *H04L 29/08072* (2013.01); *H04L 67/26* (2013.01); *H04L 67/306* (2013.01)

(58) Field of Classification Search
CPC ..... H04L 63/102; H04L 67/26; H04L 67/306; H04L 29/08072
USPC .......................... 709/203, 220, 224, 226, 228
See application file for complete search history.

(56) References Cited

U.S. PATENT DOCUMENTS

| 9,270,733 | B2* | 2/2016 | Ruppert | H04L 67/34 |
| 10,819,693 | B2* | 10/2020 | Rajagopal | G06F 21/35 |
| 2010/0250497 | A1* | 9/2010 | Redlich | H04L 63/0227 707/661 |
| 2012/0190386 | A1* | 7/2012 | Anderson | G01S 19/14 455/456.3 |
| 2013/0120611 | A1* | 5/2013 | Ogawa | H04N 5/23245 348/231.2 |
| 2016/0148679 | A1* | 5/2016 | Yoshimoto | G11C 13/0059 365/148 |

(Continued)

*Primary Examiner* — Khanh Q Dinh
(74) *Attorney, Agent, or Firm* — Schwegman Lundberg & Woessner, P.A.

(57) ABSTRACT

In an embodiment, the disclosed technologies include storing, in one or more searchable digital data structures, a set of digital entitlements; where an entitlement of the set of digital entitlements identifies a distinct computer functionality and a downstream service that can perform the distinct computer functionality using digital data; storing, in the one or more searchable digital data structures, a digital data entity; where the digital data entity includes a subset of the set of digital entitlements; storing, in the one or more searchable digital data structures, a digital mapping that associates digital data entities with entitlements of the set of digital entitlements; exposing the set of digital entitlements for use by the downstream service; exposing the digital data entity for use by an upstream service; in response to a creation of or an update of an instance of digital data via the upstream service, using the digital mapping to determine to perform the distinct computer functionality using the instance of digital data or to determine not to perform the distinct computer functionality using the instance of the digital data.

20 Claims, 5 Drawing Sheets

(56) References Cited

U.S. PATENT DOCUMENTS

2017/0019393 A1* 1/2017 Rajagopal ............. G06F 21/313
2018/0038734 A1* 2/2018 Atkinson ................ G01J 3/524
2019/0319936 A1* 10/2019 Rajagopal ............... G06F 21/43
2020/0358823 A1* 11/2020 McCarty ............... H04L 63/102

* cited by examiner

ENTITLEMENT-DRIVEN COMMUNICATION OF FUNCTIONALITY PRIVILEGES BETWEEN NETWORK-BASED SERVICES

TECHNICAL FIELD

A technical field related to this disclosure is software development. Another technical field related to this disclosure is provisioning of functionality of online systems. Another technical field related to this disclosure is support and maintenance of online systems.

BACKGROUND

Online systems often use a network, such as the Internet, to coordinate the operations of multiple networked services that operate on digital data to provide interesting and useful applications of computer functionality. Electronic notifications, digital news feeds, and online searching are examples of services that may be provided and coordinated by online systems. These and other types of network-based services can operate on or "consume" various types and forms of digital data.

For example, a push notification service may transmit electronic messages that contain digital data in the form of member connection recommendations or job opportunity recommendations. A news feed service may determine whether and when to display, and cause display of, digital content items in a 'feed' area of an online graphical user interface. A search service may index certain portions of digital data, such as member profiles or job listings, so that the data can be retrieved. A search service may index items in a certain way so that those items can be retrieved and displayed in a particular news feed or a notification, for instance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Online systems use digital data structures, such as database tables or data objects, to manipulate and store digital data. Software development professionals use computer programming or software development tools to define and create particular configurations of digital data structures for various uses and purposes.

Traditionally, levels of functionality of an online system have been defined using semantics, which are assigned at the account, customer or end user level. For example, a particular end user may be a "novice" and have access to less functionality than another end user who is a "pro." As another example, an end user who has opted for the "free" service may be entitled to use fewer of the system's capabilities than a user who has subscribed to the "premium" version of the same online service.

Also, depending on the usage level assigned to an end user of an online system, the functionality associated with digital data created by the end user during use of the online system may vary. If the user has a "basic" or "free" subscription to use the online system, for instance, then digital data created by the user may be indexed for search but may not be included in push notifications. If the user has a "premium" subscription, then digital data created by the user may be indexed and included in push notifications and included in news feeds, as well. However, these types of rules have been embedded in computer code of the supporting downstream services, in the former approaches.

These former approaches to defining usage levels have required the software developer to interpret the usage level semantics, and to program the computer to provide the requisite level of functionality to end users according to usage level while at the same time not providing functionality that a user is not entitled to use according to their usage level.

As an online system matures, new functionality is often added and older functionality may be retired. Alternatively or in addition, previously-defined usage levels may have become obsolete and need to be replaced by newer usage level definitions. As a result, interpreting usage level semantics can become increasingly complicated and confusing.

A technical limitation of existing technologies is that usage level semantics have been embedded within data type definitions. For example, a job posting may be an entity type that has usage level as an attribute. With this type of architecture, the usage level is represented by a semantic label, for example, "premium," and downstream services use the label to determine, in their program code, what functionalities the job posting can have. As a result, determining which functionalities are associated with a particular usage level requires reading potentially many lines of computer code of potentially many downstream services. If the usage level changes or the functionalities associated with a usage level change, it becomes very difficult and maybe even impossible to manage those changes across many different data items and downstream services. The destabilizing effect of code changes and the complexity of change management processes and validation processes is a significant barrier to implementing new functional capabilities.

Embodiments of the disclosed approach address these and other technical limitations of the former approaches. In an embodiment, usage-level semantics are replaced by sets of entitlements, which are maintained and managed by an entitlement management service. As used herein, an entitlement may refer to a distinct or unitary definition of functionality and the privilege to use that functionality.

In an embodiment, an entitlement is non-exhaustible and is aligned with its serving privilege at a granular level. In an embodiment, an entitlement fully encompasses a particular serving privilege for a functionality such that the same functionality does not map to more than one entitlement, i.e., there is one-to-one correspondence between entitlement and functionality. To illustrate, an entitlement should completely, but only, answer the question, "Does this entity have the privilege to be served by this (one) functionality?" Thus, using an online job search service as an example, the former approach might have defined a job posting as having a job type of "premium," but an embodiment of the disclosed approach may instead define the same job posting as "a job that includes search and push recommendations."

In an embodiment, a digital data entity introduces a layer of indirection in that the digital data entity is interposed between the digital data created in an upstream system and the services that are provided by downstream systems using such digital data. A digital data entity as used herein may refer to a definition of a particular data structure where the schema for the particular data structure has been defined to include a set of digital entitlements. For example, a schema for a digital data entity may specify that the digital data entity includes the following fields, columns, or attributes: an entity identifier, an entity name, and a list of entitlements. The list of entitlements may be included in the digital data entity directly or via an indirect reference such as a link or a key.

Particular digital data entities can then be defined or instantiated using the schema. For example, an administrator may define a "Basic Product" digital data entity that includes an "index" entitlement. The administrator may also include a "Premium Product" digital data entity that includes the "index" entitlement and also includes a "notification" entitlement. In an embodiment, the administrator may create links between digital data entities and entitlements via a graphical user interface. Behind the scenes, creating a link as used herein may refer to programmatically defining a logical relationship between two entities; for example, by including a reference to one entity in the definition of another entity. In relational databases, links can be created via foreign keys, for example. In graph-based databases, links can be defined by creating edges between nodes, for example.

Once the desired digital data entities are defined, they can be exposed for use by an upstream service. For example, an end user of the upstream service may create an instance of digital data. An example of an instance of digital data is a data record that contains digital data values organized according to a particular schema that has been defined in the upstream service. In an embodiment, an instance of digital data may include digital content of a particular job posting, such as a job description, plus meta data associated with the particular job posting, such as company name, start and end date, and geolocation. As part of the process of creating an instance of digital data, the user can link the instance of digital data to a particular digital data entity.

The process of linking instances of digital data to digital data entities can replace the former process of using semantic labels. For example, using the disclosed approach, when an end user creates a new job posting, the user can create a link between the new job posting and a digital data entity by assigning the job posting to either the Premium Product entity or the Basic Product entity, instead of selecting a semantic label. The process of selecting either the Premium Product entity or the Basic Product entity at this level removes the need for a computer programmer to hard code the semantic label in the code for the downstream services.

In an embodiment, end users may create the links between instances of digital data and digital data entities via a graphical user interface.

Benefits that may be realized by at least some embodiments described herein include reducing the number of bugs and unexpected behaviors in program code, which in turn increases agility. For example, bug fixes and changes can be made more quickly when needed and new functionality and/or new usage levels can be implemented in a timely manner. In addition, the disclosed approaches can provide calling services with a clear understanding of the precise functionality that is to be applied to a particular instance of digital data. In some embodiments, the disclosed technologies are designed to be understood and used by non-technical personnel who may not be trained to read computer code.

The disclosed technologies are not limited to the described embodiments, features, and advantages. For example, while some embodiments are disclosed in the context of jobs data, aspects of the disclosed technologies also are applicable to other types of digital data including but not limited to news feed items, such as digital images, digital music, digital video, member profiles, and electronic messages. Additionally, while certain embodiments may be disclosed in the context of an online jobs platform, aspects of the disclosed technologies are equally applicable to other domains as well as to generalized, domain-independent online systems. Other embodiments, features and aspects will become apparent from the disclosure as a whole.

Entitlement-Based Entity Creation and Management

Figure 1:
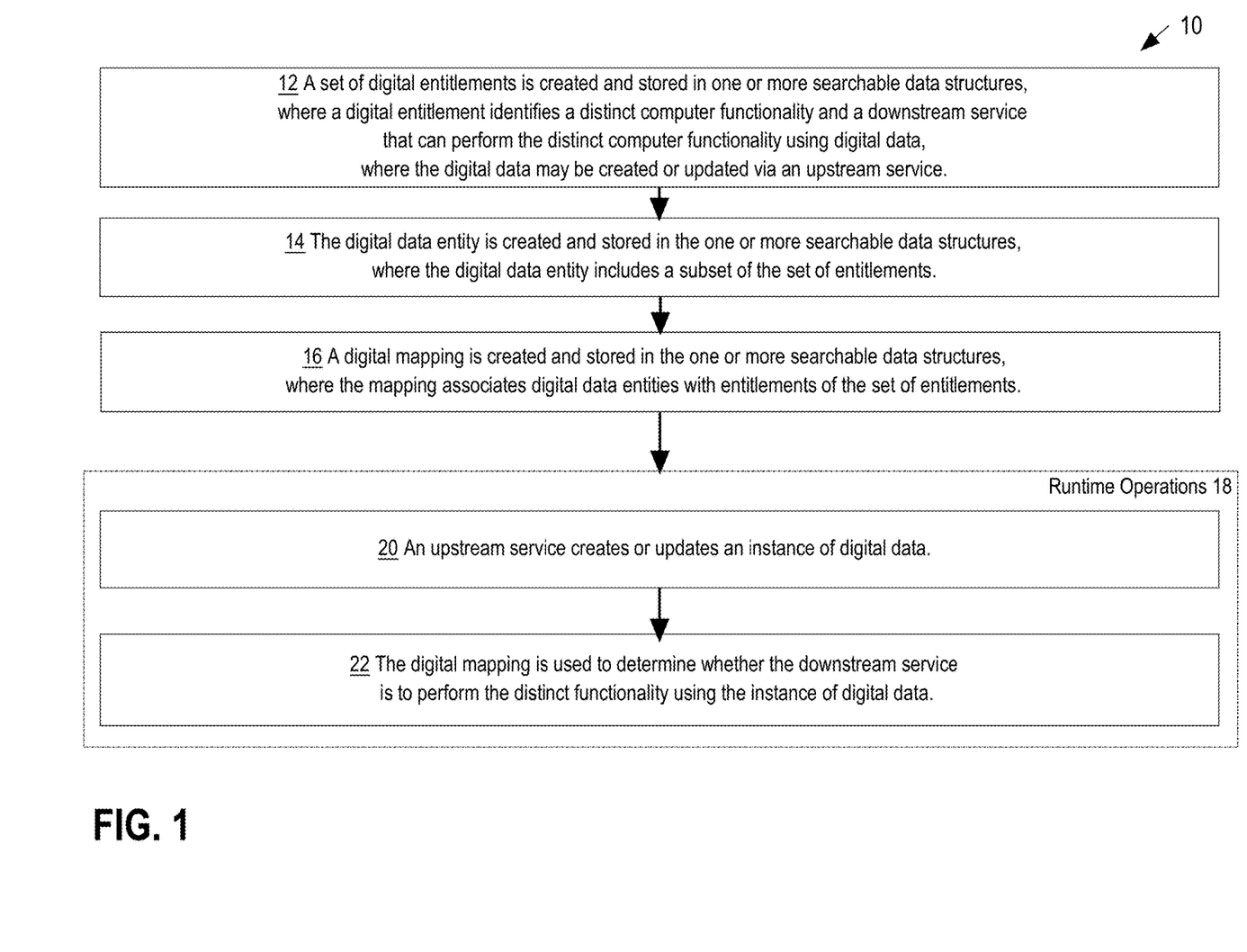
FIG. 1 is a flow diagram that depicts an example of a computer-implemented process, in an embodiment.
Figure 2:
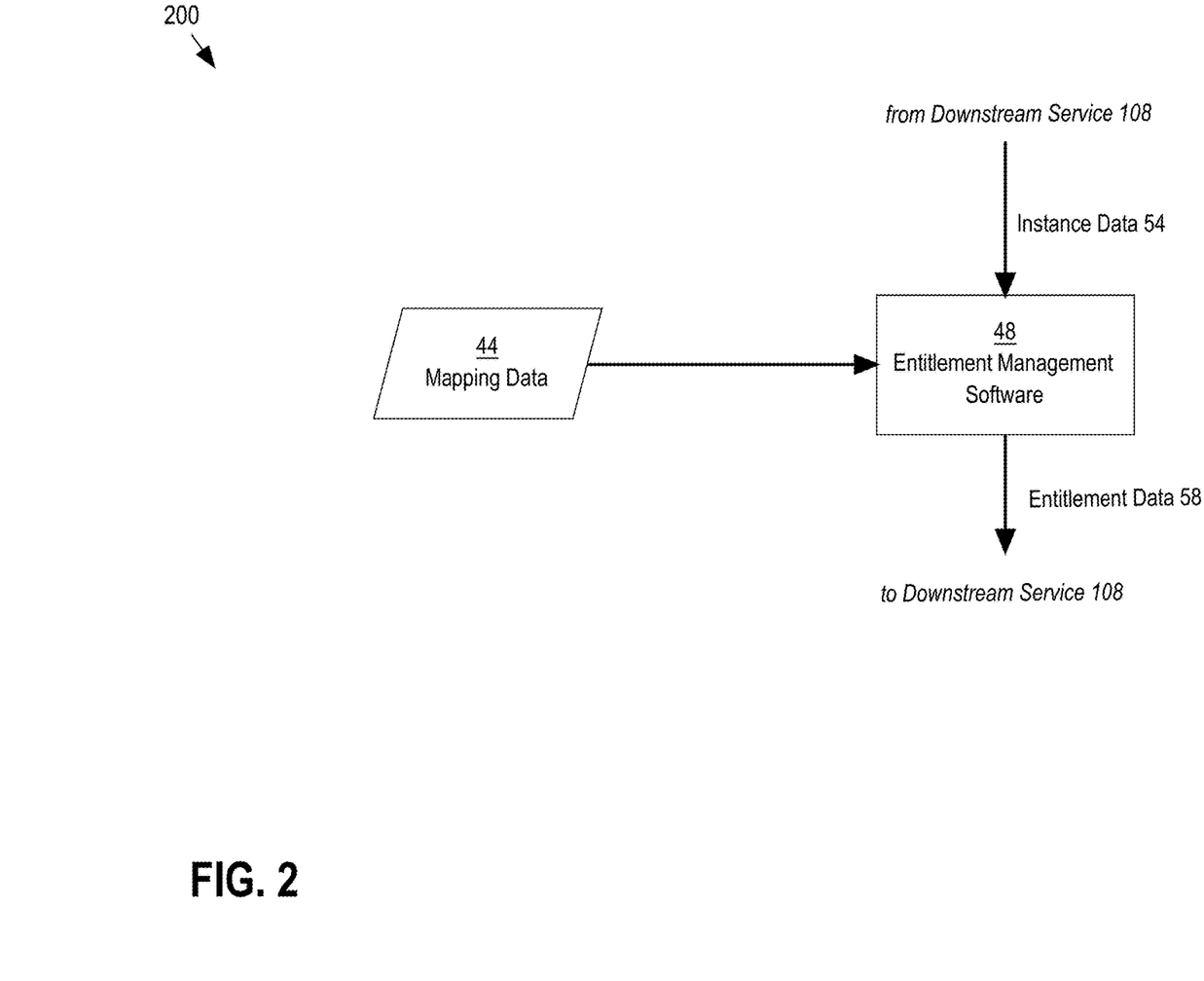
FIG. 2 is a block diagram that depicts an example software-based system, in an embodiment.
Figure 3:
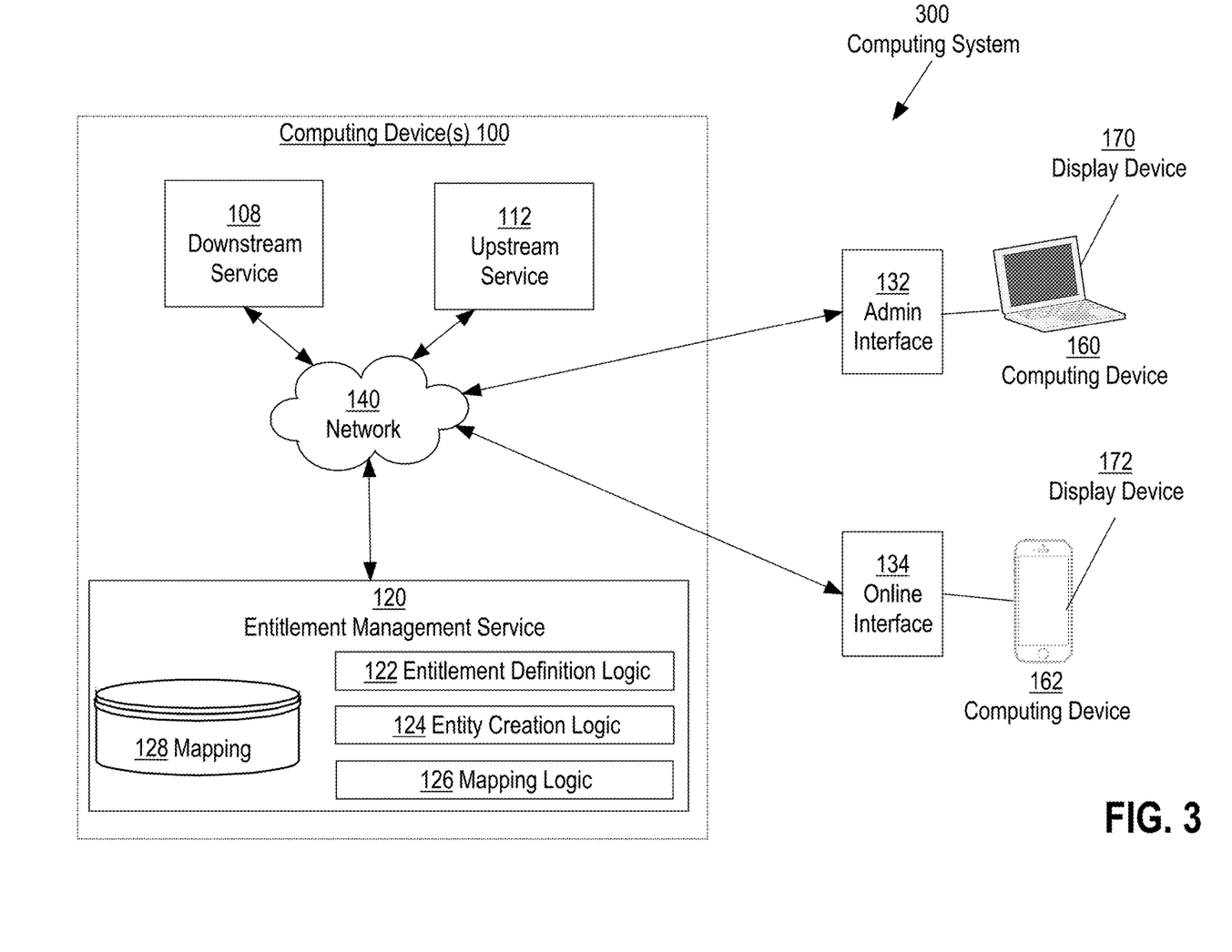
FIG. 3 is a block diagram of a networked computing system, in an embodiment.

FIG. 1 is a flow diagram that depicts a process 10 that is performed by one or more components of a computing system 100, embodiments of which are shown in FIGS. 2 and 3, described below, in an embodiment. In some embodiments, portions of process 10 are performed by entitlement management software 48, shown in FIG. 2, described below. In some embodiments, entitlement management software 48 is a component of entitlement management service 120, shown in FIG. 3, described below. For example, entitlement definition logic 122, entity creation logic 124, and mapping logic 126 may be implemented as part of entitlement management software 48. Portions of process 10 may be performed by a single entity or program or by multiple entities or programs, including for example a server computer alone or in combination with a browser plug-in.

The operations of process 10 as shown in FIG. 1 are implemented using processor-executable instructions that are stored in computer memory. For purposes of providing a clear example, the operations of FIG. 1 are described as performed by computing device(s) 100, 160, which may be individually or collectively referred to simply as a 'computing system.' In an embodiment, process 10 is configured to facilitate the communication of functionality privileges for digital data between network-based services, such as upstream services 112 and downstream services 108.

Figure 4:
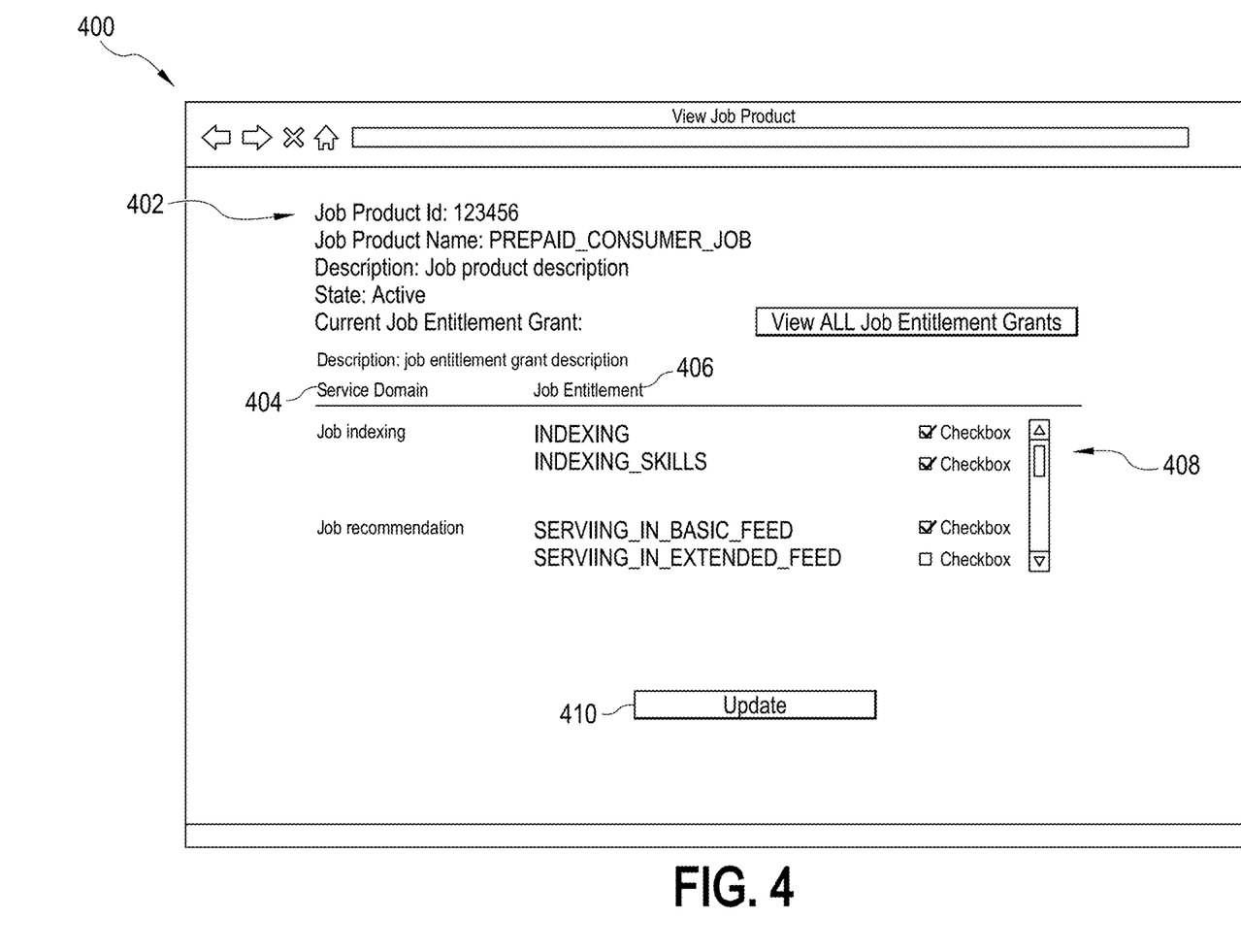
FIG. 4 is a screen capture of an example user interface, in an embodiment.

In operation 12, process 10 creates and stores, in one or more searchable data structures, a set of digital entitlements. A digital entitlement of the set of digital entitlements identifies a distinct computer functionality and a downstream service that can perform the distinct computer functionality using digital data that may be created or updated via an upstream service. A digital entitlement also represents the privilege of having the functionality identified by the entitlement. Examples of digital entitlements are shown in FIG. 4, described below. Examples of digital data include digital content items, such as job postings, member profiles, news feed items, and electronic notifications.

Examples of downstream services include but are not limited to services that perform indexing functionality or search functionality or notification functionality. The set of entitlements can include functionality that is served by a single downstream service or the set of entitlements may include functionality that is served by multiple different downstream services. In an embodiment, the set of digital entitlements is exposed or otherwise made available for use by the downstream service.

In operation 14, process 10 creates and stores, in the one or more searchable data structures, a digital data entity. The digital data entity includes a subset of the set of entitlements created in operation 12. Examples of digital data entities are "Premium Product" and "Basic Product." An example of a subset of the set of entitlements is, where the set of entitlements includes multiple different types of indexing functionality, a subset includes only one or a smaller number of those different types of indexing functionality. The digital data entity may be created or received via a graphical user interface, in an embodiment. The digital data entity is exposed or otherwise made available for use by an upstream service, in an embodiment.

In operation 16, process 10 creates and stores, in the one or more searchable data structures, a digital mapping. The digital mapping associates digital data entities created in operation 14 with entitlements of the set of digital entitlements created in operation 12. In an embodiment, links between digital data entities and entitlements are created via a graphical user interface, for example in response to a selection of a graphical element of the graphical user interface.

In an embodiment, the digital mapping output by operation 16 is interposed between the upstream service and the downstream service via an electronic communication network. In an embodiment, digital entitlements, digital data entities, and digital mappings are created and stored via one or more offline processes and/or nearline processes. Runtime operations 18 of process 10 include operation 20 and operation 22.

In an embodiment, the digital mapping enables a subset of the set of digital entitlements to be linked automatically with an instance of digital data when the instance of the digital data is assigned to a digital data entity. In an embodiment, the digital mapping enables a change in a subset of the set of digital entitlements that is associated with a digital data entity to be linked automatically with an instance of the digital data when the subset of the set of digital entitlements is changed.

In operation 20, an upstream service creates or updates an instance of digital data. Examples of an upstream service creating or updating an instance of digital data include but are not limited to an online job service creating a new job posting or updating an existing job posting and an online connection network creating a new member profile or updating an existing member profile or an online system creating a new feed item or updating an existing feed item.

In operation 22, the digital mapping created in operation 16 is used to determine whether the downstream service is to perform the distinct functionality using the instance of digital data. To do this, operation 22 maps the instance of digital data to its corresponding digital data entity. The digital mapping is used to determine the entitlements that are associated with the digital data entity that is mapped to the instance of digital data of operation 20. Thus, the entitlements that are associated with the instance of digital data of operation 20 are determined via the digital data entity.

If the downstream service serves an entitlement that is associated with the instance of digital data of operation 20 via the digital mapping, then the downstream service performs the distinct functionality associated with that entitlement using the instance of digital data. If the downstream service does not serve any of the entitlements that are associated with the instance of digital data via the mapping, then the downstream service does not perform the distinct functionality associated with any of the entitlements using the instance of digital data.

Example of Runtime Use by a Downstream Service

FIG. 2 is a block diagram that depicts an example of a runtime operation of entitlement management system, in an embodiment. The software-based components of the system of FIG. 2 include entitlement management software 48 and mapping data 44. Entitlement management software 48 performs at least operation 22 of FIG. 1, described above, in an embodiment. Mapping data 44 is a subset of mapping 128, in an embodiment. For example, mapping data 44 contains a portion of digital entity-entitlement mapping data that pertains to a particular downstream service 108, in an embodiment.

In operation, a downstream service 108 listens for data bus events or KAFKA streams, for example, that contain information about instance data 54. Instance data 54 includes or identifies, for example, a new instance of digital data or an update to an existing instance of digital data, which is consumable by downstream service 108. Downstream service 108 sends or passes instance data 54 to entitlement management software 48. Entitlement management software 48 uses mapping data 44 to determine which entitlements are associated with the instance data 54. Entitlement management software 48 identifies and outputs those entitlements as entitlement data 58 for use by downstream service 108. Downstream service 108 performs the functionality identified by entitlement data 58, using the digital data identified by instance data 54.

For example, suppose a downstream service 108 produces "Jobs you may be interested in" (JYMBII) lists, and a user of an upstream service 112 has created a new online job posting via online interface 134. Downstream service 108 may discover the new job posting via a listening process. In response to the new job posting, downstream service 108 passes the job posting identifier to entitlement management software 48. Using mapping data 44, entitlement management software 48 determines that the job posting is linked to the entity type, "level 1" and determines which entitlements are linked with the "level 1" entity type. Entitlement management software 48 outputs a list of entitlements that are linked with the "level 1" entity type to downstream service 108. Downstream service determines, based on the entitlements, that "level 1" entities can be included in certain JYMBII lists, and performs that functionality using the job posting. For instance, downstream service 108 includes the job posting in the certain JYMBII lists in accordance with the entitlement data 58.

Networked System Example

FIG. 3 is a block diagram of a networked computing system in which entitlement management service 120 may be implemented. In some embodiments, portions of entitlement management service 120 may be implemented as part of downstream service 108 or as part of upstream service 112 or as a network-based service; for example as a nearline or offline service. Portions of entitlement management service 120 may be accessed by downstream service 108 and/or upstream service 112 via one or more web services such as Representational State Transfer (REST) application program interfaces (APIs), in some embodiments.

Computing system 300 includes at least computing device(s) 100, computing devices 160, 162, and display devices 170, 172 which are communicatively coupled to an electronic communications network 140. Implemented in the devices 100, 160, 170 using computer software, hardware, or software and hardware, are combinations of automated functionality embodied in computer programming code, data structures, and digital data, which are represented schematically in FIG. 1 as downstream service 108, upstream service 112, entitlement management service 120, entitlement definition logic 122, entity creation logic 124, mapping logic 126, mapping 128, admin interface 132, online interface 134. System as used in this disclosure may refer to a single computer or network of computers and/or other devices. Computing device as used in this disclosure may refer to a computer or any other electronic device that is equipped with a processor.

Although computing system 300 may be implemented with any number N (where N is a positive integer) of downstream service 108, upstream service 112, entitlement management service 120, entitlement definition logic 122, entity creation logic 124, mapping logic 126, mapping 128, admin interface 132, online interface 134, computing devices 100, display devices 170 and computing devices 160, respectively, in this disclosure, these elements may be referred to in the singular form for ease of discussion.

Also, downstream service 108, upstream service 112, entitlement management service 120, entitlement definition logic 122, entity creation logic 124, mapping logic 126, mapping 128, admin interface 132, online interface 134 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

The illustrative downstream service 108, upstream service 112, entitlement management service 120, entitlement definition logic 122, entity creation logic 124, mapping logic 126, mapping 128, admin interface 132, online interface 134 are communicatively coupled to computing devices 160, 162 and to network 140. Portions of downstream service 108, upstream service 112, entitlement management service 120, entitlement definition logic 122, entity creation logic 124, mapping logic 126, mapping 128, admin interface 132, online interface 134 may be implemented as back-end software applications and/or web-based software applications and/or mobile device applications and may be hosted by a hosting service (not shown). For example, portions of admin interface 132 and/or online interface 134 may be implemented within a front-end portion of upstream service 112 or within a front-end portion of downstream service 108, or may be embedded within another application or as a separate application. In an embodiment, portions of admin interface 132 and/or online interface 134 are implemented in a web browser that can be executed on computing devices 160, 162.

In some embodiments, computing devices 160, 162 are client computing devices, such as an end user's smart phone, tablet computer, mobile communication device, wearable device, embedded system, smart appliance, desktop computer, or laptop machine, and computing device(s) 100 include a server computer or network of server computers located on the Internet, in the cloud. As illustrated in FIG. 1, display devices 170, 172 are implemented in computing devices 160, 162, respectively, but may be implemented as separate devices or as part of other devices, or as multiple networked display devices, in other implementations.

Downstream service 108 is a computer-implemented network-based service that provides functionality to which privileges are granted using entitlements as described herein, in an embodiment. Examples of downstream services 108 include but are not limited to search services, indexing services, notification services, automated suggestion services, news feed services, and/or any other back-end services that may called by one or more upstream services 112.

Upstream service 112 is, in an embodiment, a computer-implemented system that interfaces with various portions of downstream service 108 to provide various functionality to end users via online interface 134. Upstream service 112 is a user-facing or front-end software application that is accessible over the Internet, in an embodiment.

In an embodiment, upstream service 112 is software that is designed to provide a networking service for its members, such as a professional networking service or an online social network service. End users become members of upstream service 112 through a registration process that includes establishing a user account identifier, password, and online profile. An example of upstream service 112 is the online professional social network service known as LINKEDIN, provided by LinkedIn Corporation of Sunnyvale, Calif.

Other examples of upstream service 112 include but are not limited to the "Jobs" component of the LINKEDIN mobile device software application, the "Feed" component of the LINKEDIN mobile device software application, and the web interface of the LINKEDIN TALENT SOLUTIONS product, each provided by LinkedIn Corporation of Sunnyvale, Calif. Still other examples of upstream service 112 include user-facing portions of other online job listing services, recruiter-oriented online services, online connection networks, and online search engines.

Users of one upstream service 112 may or may not be registered in another upstream service. In some embodiments, registered users of one upstream service 112 are also, automatically, registered users of another upstream service. In other embodiments, an upstream service 112 is part of a separate application that may include a separate registration process. In those other embodiments, a portion of upstream service 112 creates and stores, in an electronic file or a mapping table, for example, a mapping that links the member registration data stored in upstream service 112 with the member registration data stored in the other upstream service, to facilitate the exchange of data between the two systems.

Entitlement management service 120 provides a programmable interface that is at least periodically coupled to admin interface 132 and/or online interface 134, downstream service 108 and/or upstream service 112 via network 140, for example on an event-driven basis. Entitlement management service 120 creates and manages relationships between digital data entities and digital entitlements as described in this disclosure. In an embodiment, entitlement management service 120 includes entitlement definition logic 122, entity creation logic 124, mapping logic 126, and mapping 128.

In an embodiment, entitlement definition logic 122 includes computer instructions for defining digital entitlements to entitlement management service 120. For example, entitlement definition logic 122 receives entitlement information that has been defined for downstream service 108, including descriptions of entitlements that downstream service 108 can provide, and creates and stores data records in a searchable database that is coupled to entitlement management service 120. In an embodiment, digital entitlement data is stored in mapping 128 while in other embodiments, digital entitlement data is stored in another searchable database. In some embodiments, entitlement definition logic 122 receives digital entitlement data via a portion of admin interface 132, described below. An example of digital entitlement data displayed in an embodiment of admin interface 132 is shown in FIG. 4, described below.

In an embodiment, entity creation logic 124 includes computer instructions for creating digital data entities in entitlement management service 120. For example, entity creation logic 124 receives information from admin interface 132, including descriptions of digital data entities that can be offered to upstream services 112. Entity creation logic 124 creates and stores data records for digital data entities in a searchable database that is coupled to entitlement management service 120. In an embodiment, digital entity data is stored in mapping 128 while in other embodiments, digital entity data is stored in another searchable database. An example of a digital data entity displayed in an embodiment of admin interface 132 is shown in FIG. 4, described below.

In an embodiment, mapping logic 126 includes computer instructions for creating logical relationships between digital entitlements and digital data entities in entitlement management service 120. For example, mapping logic 126 receives mapping information from admin interface 132. In an embodiment, mapping information is indicated by a selection of a graphical element of admin interface 132 Mapping logic 126 creates and stores data records for digital entitlement-digital data entity mappings in a searchable database that is coupled to entitlement management service 120. In an embodiment, digital entitlement-digital data entity mapping data is stored in mapping 128 while in other embodiments, digital entity data is stored in another searchable database. An example of a digital entitlement-digital data entity mapping displayed in an embodiment of admin interface 132 is shown in FIG. 4, described below.

In an embodiment, mapping 128 is implemented using one or more searchable databases to store digital entitlement data, digital entity data, and digital entitlement-digital data entity mapping data. Mapping 128 is implemented as one or more tables using a relational database management system such as ORACLE RDMS available from Oracle Corporation of Redwood City, Calif. or ESPRESSO, a distributed document store available from LinkedIn Corporation, in an embodiment. In other embodiments, other suitable data storage technologies are used.

In an embodiment, access control rules are defined that are used by the system to determine which users or user roles have the ability to create and modify entitlement data, digital entity data, and digital entitlement-digital data entity mapping data. For example, different roles may be associated with each of entitlement data, digital entity data, and digital entitlement-digital entity mapping data such that a user who creates entitlement data is not permitted to create digital entity data or digital entitlement-digital entity mapping data; a user who creates digital entity data is not permitted to create or update entitlement data or digital entitlement-digital data entity mapping data, and so on.

In an embodiment, downstream service 108 and/or upstream service 112 listen for updates to digital data entities and/or other events created by entitlement definition logic 122, entity creation logic 124, mapping logic 126, using KAFKA (open-source software for building real-time data pipelines, provided by the Apache Software Foundation), and entitlement management service 120 listens for updates and/or other events created by downstream service 108 and/or upstream service 112 using KAFKA or similarly suitable technology. Other software products providing similar or equivalent functionality as the software products mentioned in this disclosure are used in other embodiments.

Computing devices 160, 162 communicate with display devices 170, 172, respectively, and operate admin interface 132, online interface 134, respectively, to establish logical connection(s) over network 140 with portions of entitlement management service 120, downstream service 108, upstream service 112, as the case may be, either directly or via entitlement management service 120.

In an embodiment, admin interface 132 provides a front end application through which non-technical personnel may create entitlement data, digital entity data, and/or mapping data, while online interface 134 provides a front end application through which instances of digital data may be created in an upstream service 112. For example, in an embodiment, online interface 134 is a front end portion of upstream service 112 through which job postings, member profiles, or other digital content items are created.

Admin interface 132 and online interface 134 each comprise an arrangement of graphical user interface elements, such as text input boxes, text list boxes, and check boxes, in an embodiment. Each or either of admin interface 132 and online interface 134 can be embedded in a web-based application front end or a mobile device application front end, using for example an HTML (Hyper-Text Markup Language) document. In some embodiments, admin interface 132 and/or online interface 134 includes audio output or a combination of audio and visual output. An example of an embodiment of admin interface 132 is shown in FIG. 4, described below.

While not specifically shown, a presentation layer may be part of downstream service 108 and/or upstream service 112 and/or entitlement management service 120. A presentation layer is server-side software that provides data conversion and data translation services, in an embodiment. A presentation layer facilitates the generation of portions of admin interface 132 and/or online interface 134, and includes query input fields, list boxes, suggestion lists and/or elements and information, for presentation by admin interface 132 and/or online interface 134, in an embodiment.

Network 140 is an electronic communications network and may be implemented on any medium or mechanism that provides for the exchange of data between the devices that are connected to the network. Examples of network 140 include, without limitation, a network such as a Local Area Network (LAN), Wide Area Network (WAN), Ethernet or the Internet, or one or more terrestrial, satellite or wireless links.

Example of User Interface

FIG. 4 is a screen capture of an example of a user interface 400, in an embodiment. User interface 400 may facilitate the creation of digital data entities and the assignment of digital entitlements to digital data entities, particularly for non-technical personnel. User interface 400 is designed for an online jobs application. As such, the digital data entity type is "Job Product," with the title, Prepaid Consumer Job. This information and other job product data is indicated in text area 402.

A scrollable area 408 displays information about certain downstream services (Service Domains 404) and the corresponding entitlements (Job Entitlements 406) that are provided by each downstream service. For example, the downstream service Job indexing provides the entitlements: Indexing and Indexing Skills and the downstream service Job recommendation provides the entitlements Serving_in_basic_feed and Serving_in_extended_feed.

An administrator selects entitlements to be included in the job product by selecting the check boxes next to the names of the desired job entitlements. Selecting a check box, alone or in combination with another interaction, such as selecting update button 410, automatically causes the selected entitlements to be linked with the job product.

In the example of FIG. 4, the result of the check box selections is that Indexing, Indexing_skills, and Serving_in_basic_feed are all linked with the job product identified by Job Product ID. 123456 and the entitlement Serving_in_extended_feed is not linked with the job product identified by Job Product ID. 123456.

Once the job product is created, a user of the upstream online jobs application can create a job posting and link it to the job product identified by Job Product ID. 123456, via online interface 134, for example. When a job posting is linked to Job Product 123456, the Indexing, Indexing_skills, and Serving_in_basic_feed entitlements are all linked with the job posting and the entitlement Serving_in_extended_feed is not linked with that job posting. As a result, the job posting will have the privilege to be served by the downstream functionality identified by the Indexing, Indexing_skills, and Serving_in_basic_feed entitlements but will not have any privilege to be served by the downstream functionality identified by the Serving_in_extended_feed.

Using the example of FIG. 4, unchecking a checkbox automatically removes the link between an entitlement and a digital entity in the mapping data. For example, if the checkbox for the Indexing_skills entitlement is subsequently unchecked, that action, alone or in combination with another interaction, such as selecting update button 410, causes the Indexing_skills entitlement to no longer be linked with the Job product 123456, and automatically, all job postings that are linked with the job product 123456 will no longer have the Indexing_skills entitlement.

Adding an entitlement to a digital data entity works in a similar manner. For example, selecting the checkbox for Serving_in_extended_feed, alone or in combination with another interaction, such as selecting update button 410, causes the Serving_in_extended_feed to be automatically linked with the Job product 123456 and all job postings that are linked with Job product 123456.

Multiple different digital entites, for example job products, can be created using user interface 400. For example, user interface 400 may be used to create another job product, 789012, might only have the Indexing entitlement linked to it.

The disclosed approach allows entity-entitlement assignments to be easily created and modified over time as requirements and functionality change. The disclosed approach also allows these modifications to be seamlessly propagated to instances of digital data in upstream services. For example, a user of the online jobs application can change the functionality associated with a particular job posting simply by linking the job posting with a different job product. Using the disclosed approach, linking a job posting to a different job product automatically updates the entitlements for the job posting.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
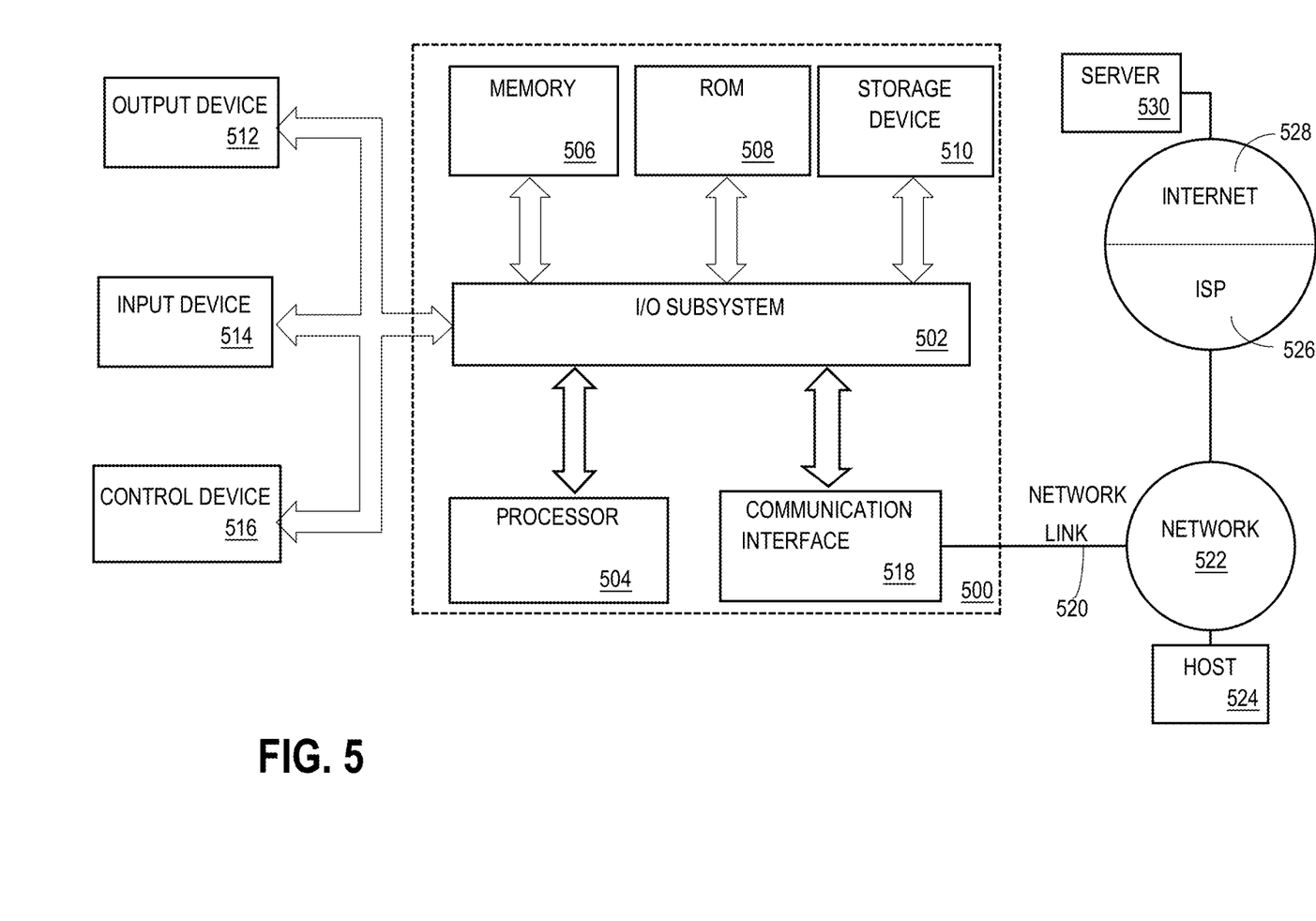
FIG. 5 is a block diagram that illustrates a computer system upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the described below.

In an example 1, a method for communicating functionality privileges for digital data between network-based services includes: storing, in one or more searchable digital data structures, a set of digital entitlements; where an entitlement of the set of digital entitlements identifies a distinct computer functionality and a downstream service that can perform the distinct computer functionality using digital data; storing, in the one or more searchable digital data structures, a digital data entity; where the digital data entity includes a subset of the set of digital entitlements; storing, in the one or more searchable digital data structures, a digital mapping that associates digital data entities with entitlements of the set of digital entitlements; exposing the set of digital entitlements for use by the downstream service; exposing the digital data entity for use by an upstream service; in response to a creation of or an update of an instance of digital data via the upstream service, using the digital mapping to determine to perform the distinct computer functionality using the instance of the digital data or to determine not to perform the distinct computer functionality using the instance of the digital data; where the method is performed by one or more computing devices.

An example 2 includes the subject matter of example 1, including in response to an assignment of the instance of digital data to the digital data entity, automatically associating the subset of the set of digital entitlements with the instance of digital data. An example 3 includes the subject matter of example 1, including, in response to a change in the subset of the set of digital entitlements that is associated with the digital data entity, automatically associating the change in the subset of the set of digital entitlements with the instance of digital data. An example 4 includes the subject matter of example 1, including receiving the digital data entity via a graphical user interface that is coupled to the one or more searchable digital data structures. An example 5 includes the subject matter of example 4, including in response to a selection of a graphical element of the graphical user interface, automatically assigning a digital entitlement to the digital data entity. An example 6 includes the subject matter of example 4, including receiving the instance of digital data via a different graphical user interface than the graphical user interface that is coupled to the one or more searchable digital data structures; where the different graphical user interface is coupled to the upstream service. An example 7 includes the subject matter of example 1, where the set of digital entitlements are defined by the downstream service and include one or more of an indexing functionality or a search functionality or a notification functionality. An example 8 includes the subject matter of example 1, where the digital mapping is interposed between the upstream service and the downstream service via an electronic communication network. An example 9 includes the subject matter of example 1, where the instance of digital data includes an online job posting, the digital data entity represents a category of online job postings, and the distinct computer functionality identified by the entitlement includes an indexing functionality or a search functionality or a notification functionality. An example 10 includes the subject matter of example 1, where the upstream service includes or is coupled to an online connection network, the instance of digital data includes a feed item or a member profile, the digital data entity represents a category of feed items or member profiles, and the distinct computer functionality identified by the entitlement includes an indexing functionality or a search functionality or a notification functionality.

In an example 11, one or more non-transitory computer-readable storage media storing instructions which, when executed by one or more processors, cause: storing, in one or more searchable digital data structures, a set of digital entitlements; where an entitlement of the set of digital entitlements identifies a distinct computer functionality and a downstream service that can perform the distinct computer functionality using digital data; storing, in the one or more searchable digital data structures, a digital data entity; where the digital data entity includes a subset of the set of digital entitlements; storing, in the one or more searchable digital data structures, a digital mapping that associates digital data entities with entitlements of the set of digital entitlements; exposing the set of digital entitlements for use by the downstream service; exposing the digital data entity for use by an upstream service; in response to a creation of or an update of an instance of digital data via the upstream service, using the digital mapping to determine to perform the distinct computer functionality using the instance of digital data or to determine not to perform the distinct computer functionality using the instance of the digital data.

An example 11 includes the subject matter of example 11, where the instructions, when executed by the one or more processors, further cause, in response to an assignment of the instance of digital data to the digital data entity, automatically associating the subset of the set of digital entitlements with the instance of digital data. An example 13 includes the subject matter of example 11, where the instructions, when executed by the one or more processors, further cause, in response to a change in the subset of the set of digital entitlements that is associated with the digital data entity, automatically associating the change in the subset of the set of digital entitlements with the instance of digital data. An example 14 includes the subject matter of example 11, where the instructions, when executed by the one or more processors, further cause receiving the digital data entity via a graphical user interface that is coupled to the one or more searchable digital data structures. An example 15 includes the subject matter of example 14, where the instructions, when executed by the one or more processors, further cause, in response to a selection of a graphical element of the graphical user interface, automatically assigning a digital entitlement to the digital data entity. An example 16 includes the subject matter of example 14, where the instructions, when executed by the one or more processors, further cause receiving the instance of digital data via a different graphical user interface than the graphical user interface that is coupled to the one or more searchable digital data structures; where the different graphical user interface is coupled to the upstream service. An example 17 includes the subject matter of example 11, where the set of digital entitlements are defined by the downstream service and include one or more of an indexing functionality or a search functionality or a notification functionality. An example 18 includes the subject matter of example 11, where the digital mapping is interposed between the upstream service and the downstream service via an electronic communication network. An example 19 includes the subject matter of example 11, where the instance of digital data includes an online job posting, the digital data entity represents a category of online job postings, and the distinct computer functionality identified by the entitlement includes an indexing functionality or a search functionality or a notification functionality. An example 20 includes the subject matter of example 11, where the upstream service includes or is coupled to an online connection network, the instance of digital data includes a feed item or a member profile, the digital data entity represents a category of feed items or member profiles, and the distinct computer functionality identified by the entitlement includes an indexing functionality or a search functionality or a notification functionality.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for communicating functionality privileges for digital data between network-based services, the method comprising:
   storing, in one or more searchable digital data structures, a set of digital entitlements;
   wherein an entitlement of the set of digital entitlements identifies a distinct computer functionality and a downstream service that can perform the distinct computer functionality using digital data;
   storing, in the one or more searchable digital data structures, a digital data entity;
   wherein the digital data entity includes a subset of the set of digital entitlements;
   storing, in the one or more searchable digital data structures, a digital mapping that associates digital data entities with entitlements of the set of digital entitlements;
   exposing the set of digital entitlements for use by the downstream service;
   exposing the digital data entity for use by an upstream service;
   in response to a creation of or an update of an instance of digital data via the upstream service, using the digital mapping to determine to perform the distinct computer functionality using the instance of digital data or to determine not to perform the distinct computer functionality using the instance of the digital data;
   wherein the method is performed by one or more computing devices.

2. The method of claim 1, comprising in response to an assignment of the instance of digital data to the digital data entity, automatically associating the subset of the set of digital entitlements with the instance of digital data.

3. The method of claim 1, comprising, in response to a change in the subset of the set of digital entitlements that is associated with the digital data entity, automatically associating the change in the subset of the set of digital entitlements with the instance of digital data.

4. The method of claim 1, comprising receiving the digital data entity via a graphical user interface that is coupled to the one or more searchable digital data structures.

5. The method of claim 4, comprising in response to a selection of a graphical element of the graphical user interface, automatically assigning a digital entitlement to the digital data entity.

6. The method of claim 4, comprising receiving the instance of digital data via a different graphical user interface than the graphical user interface that is coupled to the one or more searchable digital data structures; wherein the different graphical user interface is coupled to the upstream service.

7. The method of claim 1, wherein the set of digital entitlements are defined by the downstream service and include one or more of an indexing functionality or a search functionality or a notification functionality.

8. The method of claim 1, wherein the digital mapping is interposed between the upstream service and the downstream service via an electronic communication network.

9. The method of claim 1, wherein the instance of digital data comprises an online job posting, the digital data entity represents a category of online job postings, and the distinct computer functionality identified by the entitlement comprises an indexing functionality or a search functionality or a notification functionality.

10. The method of claim 1, wherein the upstream service comprises or is coupled to an online connection network, the instance of digital data comprises a feed item or a member profile, the digital data entity represents a category of feed items or member profiles, and the distinct computer functionality identified by the entitlement comprises an indexing functionality or a search functionality or a notification functionality.

11. One or more non-transitory computer-readable storage media storing instructions which, when executed by one or more processors, cause:

storing, in one or more searchable digital data structures, a set of digital entitlements;

wherein an entitlement of the set of digital entitlements identifies a distinct computer functionality and a downstream service that can perform the distinct computer functionality using digital data;

storing, in the one or more searchable digital data structures, a digital data entity;

wherein the digital data entity includes a subset of the set of digital entitlements;

storing, in the one or more searchable digital data structures, a digital mapping that associates digital data entities with entitlements of the set of digital entitlements;

exposing the set of digital entitlements for use by the downstream service;

exposing the digital data entity for use by an upstream service;

in response to a creation of or an update of an instance of digital data via the upstream service, using the digital mapping to determine to perform the distinct computer functionality using the instance of digital data or to determine not to perform the distinct computer functionality using the instance of the digital data.

12. The one or more non-transitory computer-readable storage media of claim 11, wherein the instructions, when executed by the one or more processors, further cause, in response to an assignment of the instance of digital data to the digital data entity, automatically associating the subset of the set of digital entitlements with the instance of digital data.

13. The one or more non-transitory computer-readable storage media of claim 11, wherein the instructions, when executed by the one or more processors, further cause, in response to a change in the subset of the set of digital entitlements that is associated with the digital data entity, automatically associating the change in the subset of the set of digital entitlements with the instance of digital data.

14. The one or more non-transitory computer-readable storage media of claim 11, wherein the instructions, when executed by the one or more processors, further cause receiving the digital data entity via a graphical user interface that is coupled to the one or more searchable digital data structures.

15. The one or more non-transitory computer-readable storage media of claim 14, wherein the instructions, when executed by the one or more processors, further cause, in response to a selection of a graphical element of the graphical user interface, automatically assigning a digital entitlement to the digital data entity.

16. The one or more non-transitory computer-readable storage media of claim 14, wherein the instructions, when executed by the one or more processors, further cause receiving the instance of digital data via a different graphical user interface than the graphical user interface that is coupled to the one or more searchable digital data structures; wherein the different graphical user interface is coupled to the upstream service.

17. The one or more non-transitory computer-readable storage media of claim 11, wherein the set of digital entitlements are defined by the downstream service and include one or more of an indexing functionality or a search functionality or a notification functionality.

18. The one or more non-transitory computer-readable storage media of claim 11, wherein the digital mapping is interposed between the upstream service and the downstream service via an electronic communication network.

19. The one or more non-transitory computer-readable storage media of claim 11, wherein the instance of digital data comprises an online job posting, the digital data entity represents a category of online job postings, and the distinct computer functionality identified by the entitlement comprises an indexing functionality or a search functionality or a notification functionality.

20. The one or more non-transitory computer-readable storage media of claim 11, wherein the upstream service comprises or is coupled to an online connection network, the instance of digital data comprises a feed item or a member profile, the digital data entity represents a category of feed items or member profiles, and the distinct computer functionality identified by the entitlement comprises an indexing functionality or a search functionality or a notification functionality.

\* \* \* \* \*